May 1, 1951 H. W. PRICE 2,551,287
VEHICLE CONTROL MECHANISM
Filed Sept. 23, 1942 6 Sheets-Sheet 1

INVENTOR.
HAROLD W. PRICE
BY H. O. Clayton

INVENTOR.
HAROLD W. PRICE
BY H.O. Clayton

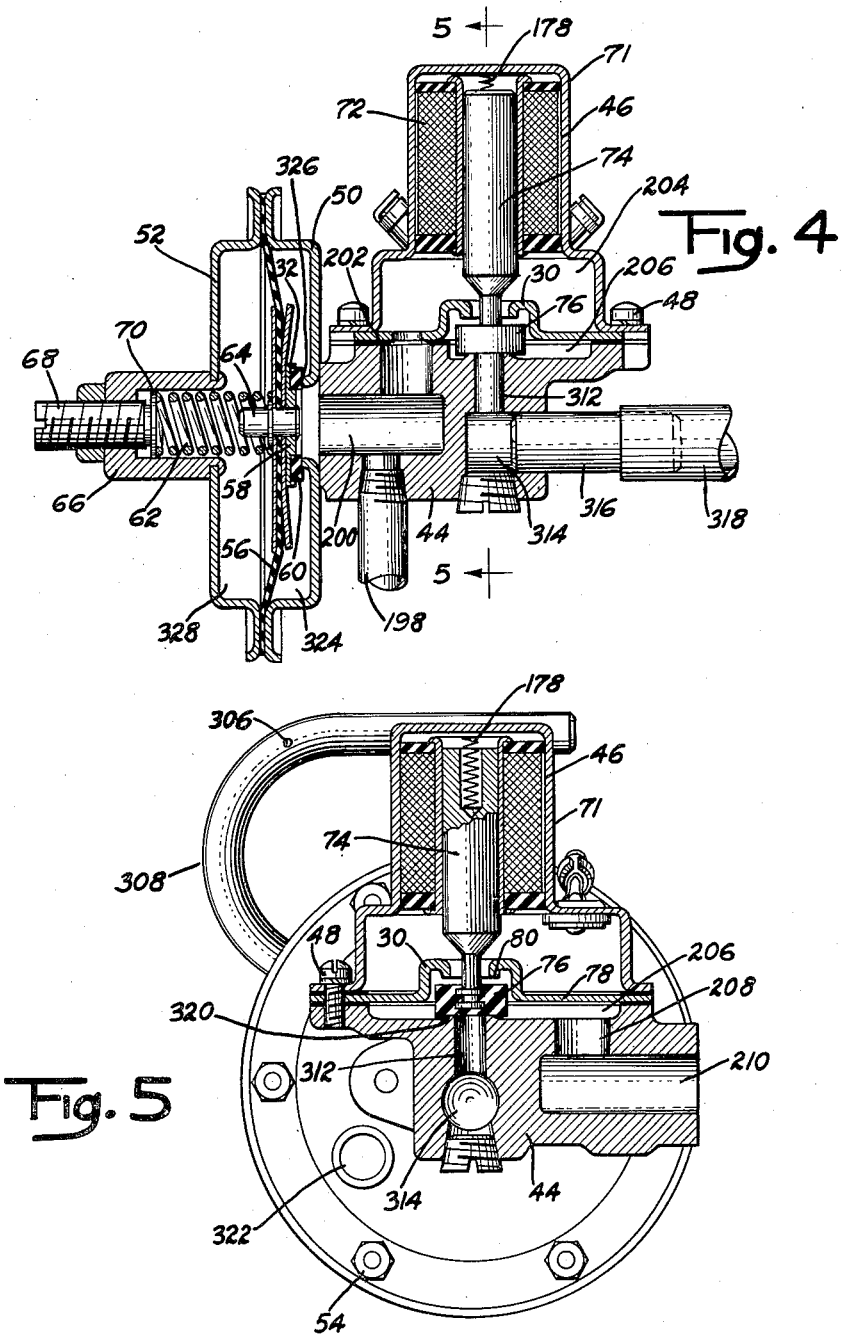

May 1, 1951  H. W. PRICE  2,551,287
VEHICLE CONTROL MECHANISM
Filed Sept. 23, 1942  6 Sheets-Sheet 4

INVENTOR.
HAROLD W. PRICE
BY H. O. Clayton

May 1, 1951 — H. W. PRICE — 2,551,287
VEHICLE CONTROL MECHANISM
Filed Sept. 23, 1942 — 6 Sheets-Sheet 5

INVENTOR.
HAROLD W. PRICE
BY

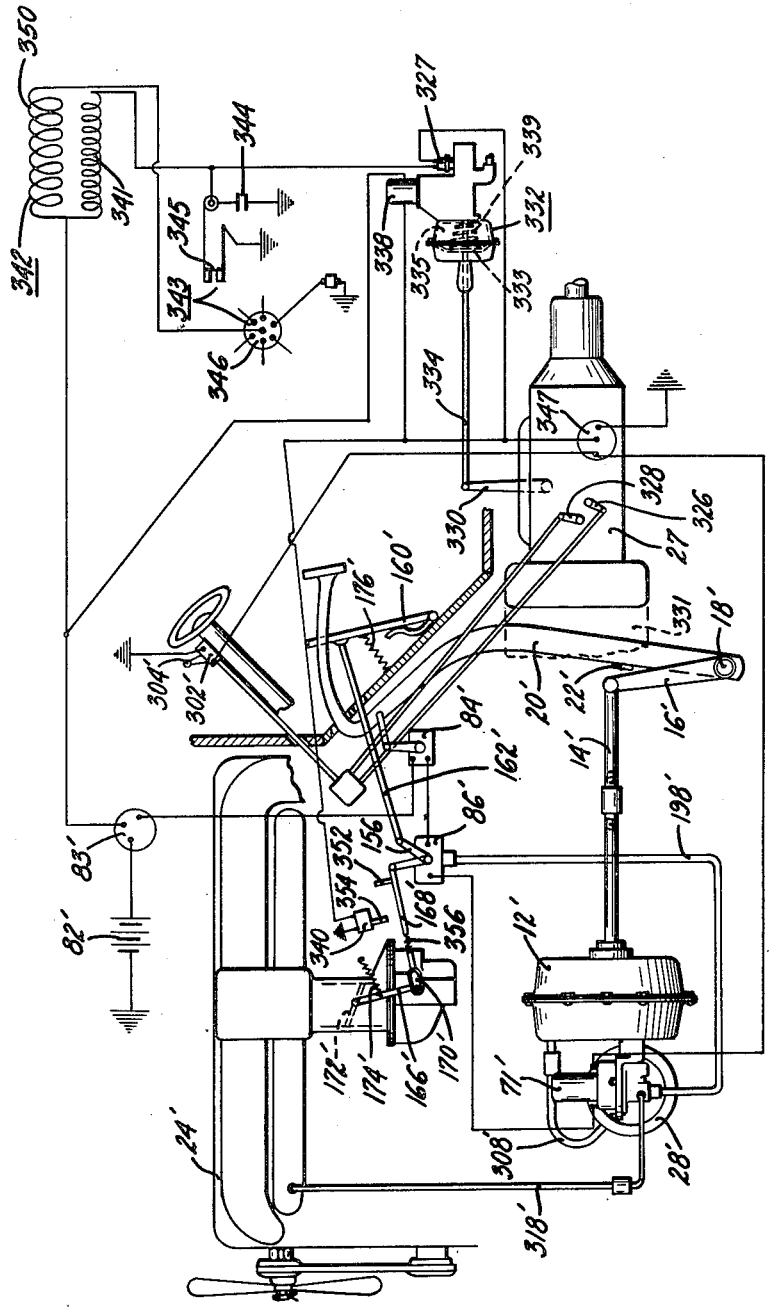

Patented May 1, 1951

2,551,287

UNITED STATES PATENT OFFICE 2,551,287

VEHICLE CONTROL MECHANISM

Harold W. Price, South Bend, Ind., assignor to Bendix Aviation Corporation, South Bend, Ind., a corporation of Delaware Application September 23, 1942, Serial No. 459,383

8 Claims. (Cl. 192—.073)

This invention relates in general to power operated mechanism for actuating a friction clutch in the power plant of an automotive vehicle, said plant being provided with a selective gear transmission controlled by a manually operated selector lever mounted near the steering wheel of the vehicle.

One of the principal objects of my invention is to provide in the aforementioned power plant, or a power plant including a manually and kickdown operated selective gear transmission and a fluid clutch located between the internal combustion engine and a friction clutch, a friction clutch operating power means operative to effect a disengagement of the friction clutch when the accelerator is released and the aforementioned selector is moved to establish the transmission in gear. A further object of my invention is to provide, in either one of the aforementioned power plants, a friction clutch operating power means operative to effect a disengagement of the clutch when the accelerator is released to idle the engine and the vehicle is either at a standstill or is travelling at or below a certain speed. Now the accelerator constitutes one of the controls of the aforementioned kickdown transmission mechanism, accordingly, it follows that in the transmission operating mechanism and the clutch operating mechanism of my invention both the shift lever and accelerator constitute controls for both of said mechanisms.

Yet another object of my invention is to provide, in either one of the aforementioned power plants, a friction clutch operating power means operative to effect a movement of the clutch plates into initial contact with each other after the gear selecting movement of the selector lever has been completed and the vehicle is exceeding a certain speed. A depression of the accelerator then serves to open the throttle and at the same time complete the clutch engaging operation of the power means, the degree of the loading of the clutch plates being directly proportional to the degree of depression of the accelerator.

A further object of my invention is to provide a pressure differential operated motor for operating the friction clutch of an automotive vehicle, said motor being controlled by valve mechanism operative, when the accelerator is released sufficiently to close a switch and sufficient pressure is exerted upon the aforementioned transmission controlling selector to close a switch, to effect a clutch disengaging operation of said motor. Said motor is then operative, when the driver removes his hand from the selector, that is after the transmission is placed in gear, to control the engagement of the clutch. Yet another object of my invention is to combine with this clutch control mechanism, and particularly one including in addition to the selector lever control means a vehicle speed responsive governor operated control means, a kickdown transmission mechanism of the day; and this latter mechanism may or may not include a fluid coupling. One type of kickdown transmission of the day includes a transmission unit which is selectively operable by a manually operated shift lever to establish the unit in any one of a reverse gear setting, a transmission neutral setting, a low range setting or a high range setting; and another type of transmission mechanism of the day includes a transmission unit which is selectively established, by an operation of the shift lever, in any one of a reverse gear setting, a transmission neutral setting, a mud gear setting and an automatic setting. With both of these types of kickdown transmission mechanism there is provided a vacuum and spring operated motor, controlled in part by an operation of the accelerator and a vehicle speed responsive governor, said motor being operable to effect either a kickdown or an upshift operation of the transmission unit.

A further object of my invention is to provide a pressure differential operated clutch operating power unit, the clutch engaging and disengaging operations of said unit being controlled in part by a solenoid operated three-way valve and the clutch engaging operation of said unit being controlled in part by a pressure differential and spring operated first stage bleed valve, both of said valves and the solenoid being compacted into one unit mounted on the suction side of said motor.

Yet another object of my invention is to provide an accelerator operated bleed valve and switch unit for in part controlling the operation of a clutch operating pressure differential operated motor, said unit cooperating with the aforementioned solenoid operated three-way and bleed valve unit.

A further object of my invention is to provide a two stage friction clutch operating mechanism controlled by either the accelerator of the vehicle and a vehicle speed responsive governor or by said accelerator and a transmission controlling selector lever.

A further object of my invention is to provide a manifold vacuum operated clutch operating motor operative to disengage the friction clutch of an automotive vehicle when the car is at a standstill and the accelerator is released, said motor, however, being rendered inoperative to so operate the clutch when the clutch pedal of the vehicle is manually depressed to disengage the clutch prior to cranking the engine. Such a mechanism insures the desired resistance to movement of the clutch pedal as the clutch is being manually disengaged despite a cranking of the engine; for if the clutch control mechanism of my invention were not disabled when the clutch is being manually disengaged then there would result, by virtue of the energization of the clutch operating motor, an undesirable sudden lessening of the resistance to movement of the clutch pedal before said movement is completed.

Yet another object of my invention is to provide a simple, compact and effective pressure differential operated power unit for effecting an operation of a friction clutch.

A futher object of my invention is to provide, in an automotive power plant comprising an internal combustion engine, a selective gear transmission capable of being manually operated, a friction clutch mounted between the engine and transmission, a fluid clutch mounted between the engine and friction clutch and a propeller shaft, means for effecting a smooth start of the vehicle irrespective of the setting of the transmission and for effecting a subsequent transmission of power from the engine to the propeller shaft without jerking the vehicle and without unduly speeding up the engine.

Yet another object of my invention is to so construct and arrange the parts of the last mentioned power plant as to control the same, under all normal driving conditions, solely by the operation of the accelerator and the aforementioned transmission and friction clutch controlling selector lever.

An important object of my invention is to provide a power plant for an automotive vehicle including a kick-down transmission mechanism of the day in combination with a fluid coupling, the operation of a portion of said transmission mechanism being facilitated by a certain operation of the friction clutch of the power plant. the entire mechanism, including the friction clutch and the transmission mechanism, being controlled by an operation of the accelerator and the shift lever of the power plant.

Other objects of the invention and desirable details of construction and combinations of parts will become apparent from the following description of a preferred embodiment, which description is taken in conjunction with the accompanying drawings, in which:

Figure 4 is a sectional view, taken on the line 4—4 of Figure 2 of the valve mechanism of Figures 2 and 3 disclosing the details thereof;

Figure 5 is a sectional view, taken on the line 5—5 of Figure 4;

Figure 11 is a diagrammatic view disclosing the power plant of an automotive vehicle said plant including a kickdown transmission mechanism and further including the friction clutch operating power means disclosed in Figure 1.

Figure 1:
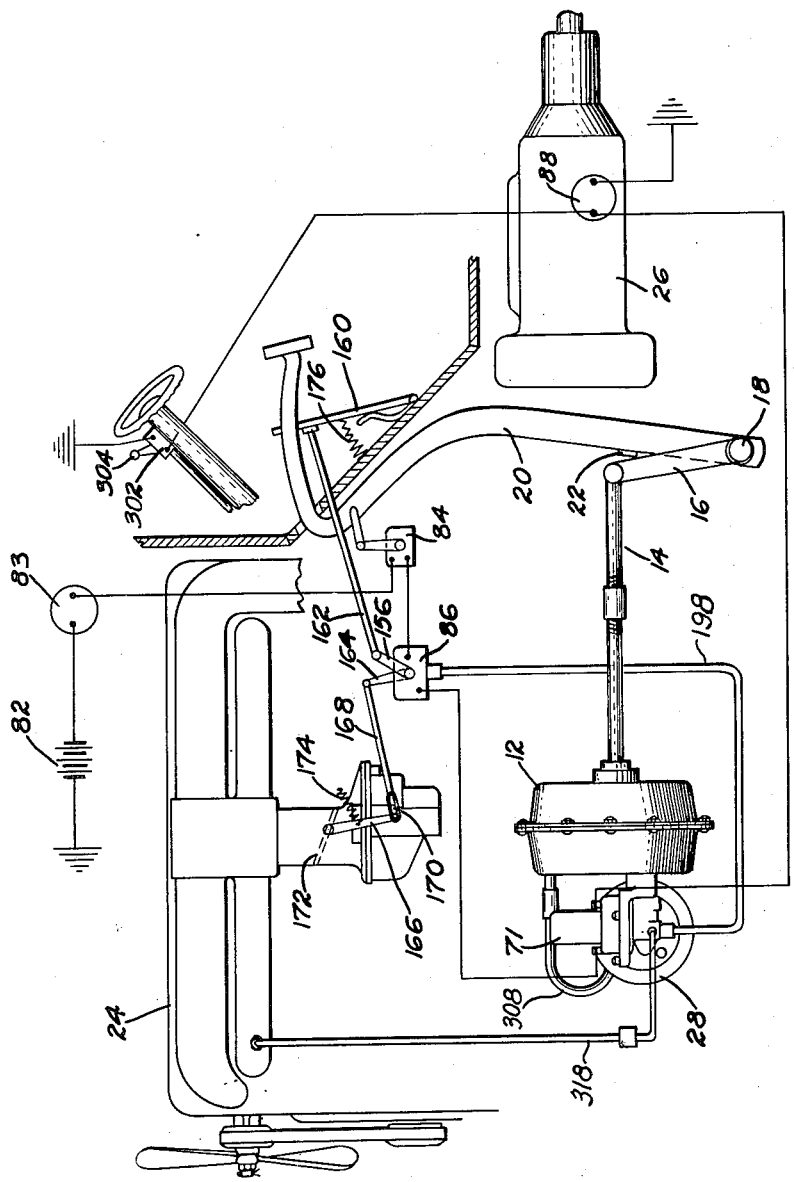
Figure 1 is a diagrammatic view disclosing parts of the power plant of an automotive vehicle and also disclosing the friction clutch operating power means constituting the principal feature of my invention.
Figure 2:
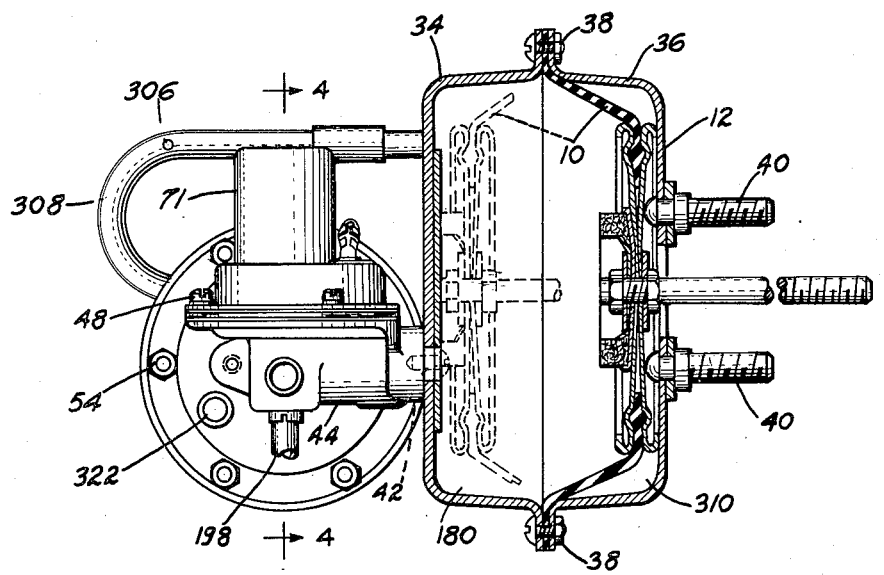
Figure 2 is a view of the clutch controlled motor and valve unit mounted thereon, the valve mechanism being shown in end elevation and the motor in longitudinal section.
Figure 3:
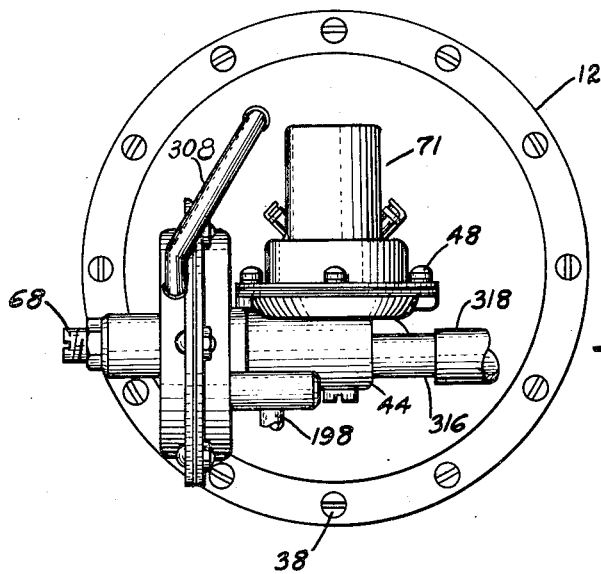
Figure 3 is an end elevational view of the motor and valve unit of Figure 2.

Referring to Figure 1 diagrammatically disclosing a preferred embodiment of my invention, the power element 10 of a single acting clutch operating motor unit 12, Figure 2, is operably connected by a rod 14 to a crank 16 keyed to a shaft 18 which is operably connected to the driven element of a friction clutch, not shown. A clutch pedal 20, rotatably mounted on said shaft 18 is provided with a stop 22 contactible with the crank 16 thereby providing means for manually operating the clutch when the motor is inoperative. As disclosed in Figure 1 the power plant of the vehicle also includes an internal combustion engine 24 and a selective gear transmission 26. The aforementioned friction clutch is of course interposed in said power plant between the engine and transmission and said power plant also preferably includes a fluid clutch, not shown, interposed between the engine and friction clutch.

The friction clutch operating motor unit 12 is in part controlled by a compact valvular unit 28 mounted on the suction side of the motor, the details of said unit being disclosed in Figures 2-5 inclusive. This unit includes a three-way valve mechanism 30 operative to effect the clutch disengaging and initiate the clutch engaging operations of the motor and also includes a first stage bleed valve 32 which is automatically operative, when the clutch plates contact at a predetermined load, to terminate a relatively fast clutch engaging movement of the motor power element 10. The motor 12 is also in part controlled by a second stage bleed valve 33, Figures 6 and 7, operated by the accelerator and operative to control the loading of the clutch plates as said plates are moved, by a clutch spring not shown, into firm engagement with each other.

Describing now in detail the clutch control motor unit 12 disclosed in Figures 2 to 5 inclusive, the motor part thereof, disclosed in section in Figure 2, includes cup shaped casing members 34 and 36 each provided with a flange and between said flanges there is detachably secured by fastening means 38, a flexible portion of the power element 10 of said motor. The motor unit is preferably detachably secured, by studs 40, to some part of the chassis of the vehicle or other convenient support located near the clutch operating crank 16.

The aforementioned three-way valve and first stage valve, together with the means for operating said valves, is detachably secured as a unit to the casing member 36 by a stud 42 extending into a body member 44 of said unit. This unit includes a cup shaped casing member 46 detachably secured, by studs 48, to the body member 44 and also includes cup shaped casing members 50 and 52 together constituting a housing for the first stage valve 32 and the power means for operating said valve. The casing members 50 and 52 are each provided with a flange and between said flanges there is secured, by studs 54, a flexible diaphragm 56 constituting the power element of the power means for operating the valve 32. To the central part of the diaphragm 56 there is secured a hub member 58 which is recessed to receive a valve member 60 constituting the most important element of the first stage valve mechanism 32. The diaphragm 56 is biased, to the valve closed position disclosed in Figure 4, by a spring 62, one end of said spring being sleeved over a pin 64 extending through the center of the diaphragm 56 into hub member 58 and secured thereto. The other end of the spring 62 extends within the interior of a cup shaped member 66 fixedly secured to the central part of the casing member 52. A stud 68 having an enlarged end portion 70 abutting the spring 62, is threadedly mounted in the base portion of the member 66.

Describing now the valve mechanism 30 and the means for operating the same the casing member 46 constitutes a housing for a valve operating solenoid 71 comprising a winding 72 and an armature 74 to the lower end of which is secured a valve member 76. A disk shaped member 78 is detachably secured, by the studs 48, to the body member 44 and the casing member 46 and said member 78 is cupped in its central portion and provided with a flange 80 which constitutes a seat for the valve member 76.

Figure 7:
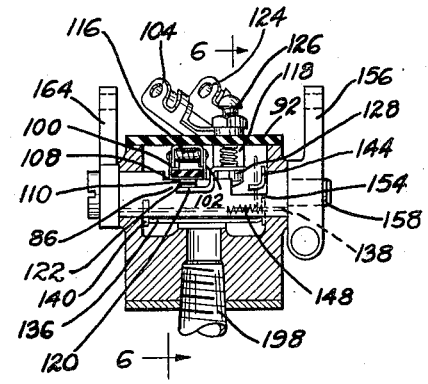
Figure 7 is a sectional view of the valve and switch mechanism of Figure 6 taken on the line 7—7 thereof.

As disclosed in Figure 1 the valve operating solenoid 71 is electrically connected in series with a grounded battery 82, an ignition switch 83, a clutch pedal operated breaker switch 84, an accelerator operated breaker switch 86, Figure 7, and a grounded governor operated breaker switch 88. When these four switches are closed, that is, when the accelerator is released, the vehicle is at a standstill or is travelling at or below governor speed, the ignition switch is closed and the clutch pedal is released, the valve operating solenoid is energized to effect a clutch disengaging operation of the motor unit 12. As the clutch pedal is being moved to its clutch disengaged position the switch 84 is preferably opened at the cushion point of the clutch plates, that is, the position of the movable driven clutch plate when it is in slight contact with the driving clutch plate; and this operation renders the clutch control mechanism inoperative until such time as the clutch pedal is returned to its clutch engaged position.

Explaining the function of the switch 84, when the engine is dead and the car is at a standstill it is best to manually disengage the friction clutch prior to cranking the engine; for regardless of whether or not the transmission 26 is in neutral and regardless of the operation of the fluid clutch it is always best, to avoid a possible stalling of the engine, to unload the engine as much as possible. If, perchance the transmission is in gear, then it is quite necessary to manually disengage the friction clutch before cranking the engine. This desirable unloading of the engine is of course accomplished by disengaging the friction clutch and this must be done by depressing the clutch pedal 20. This operation is necessary for the reason that at this time, that is, before the engine is started, there is no source of vacuum to energize the clutch operating motor 12. Now if perchance the driver is a little slow in moving the clutch pedal to its clutch disengaged position, that is, the position of the pedal necessary to effect the same separation of the clutch plates as is effected by a clutch disengaging operation of the motor unit 12, and if, during this movement, there is created a source of vacuum in the intake manifold by a starting of the engine, then the clutch motor unit will be energized before the clutch disengaging movement of the clutch pedal is completed; and this results in a sudden reduction of the force necessary to complete the disengagement of the clutch or, expressed in other words, a lightening of the clutch pedal. This is of course an undesirable effect and will probably result in the clutch pedal being slammed against the floorboard. The incorporation of the switch 84 in the means for controlling the clutch control valve 30 prevents this undesirable result.

Figure 6:
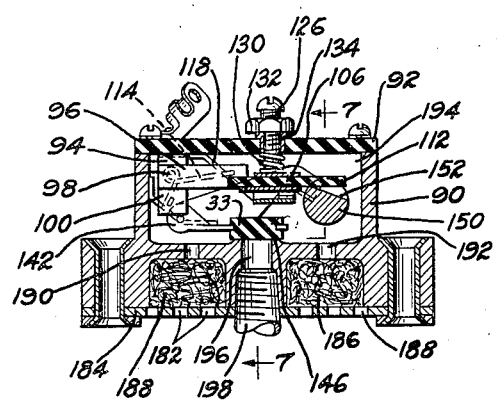
Figure 6 is a sectional view, taken on the line 6—6 of Figure 7, of the accelerator operated switch and second stage bleed valve mechanism of the clutch control mechanism constituting my invention.

Referring now to Figures 6 and 7 there is here disclosed the second stage bleed valve 33, the switch 86, Figure 7, and the accelerator operated means for operating said valve and switch. This mechanism includes a casing 90 hollowed out in the upper part thereof to receive the switch 86, the valve 33 and the means for operating the switch and valve. To the underside of a cover member 92, which is made of a non-conductive material, there is secured a U-shaped metallic member 94 serving as a support for a movable contact member 96 pivotally mounted on a pin 98 extending through said support and arms 100 and 102 of the movable contact member. A clip 104, mounted on the top of the cover member 92, is secured to the member 94 and to this clip there is attached the conductor, Figure 1, connected with the winding 72 of the solenoid. This movable contact member includes a U-shaped member 106, a contact member 108 secured to the member 106 and abutting a movable contact member 110 when the switch is closed, a rectangular shaped filler member 112 and the aforementioned arms 100 and 102. A prong 114 of a coil spring 116, sleeved over the pin 98, lies upon the top of the filler member 112 fitted within the U-shaped member 106, said prong serving to bias the movable contact member to its switch closed position. To the underside of the cover member 92 and by the side of the movable contact member there is secured a stamping 118, said stamping being provided at one of its ends with a laterally extending projection 120 to which is secured the fixed contact member 122. A clip 124, mounted on the top of the cover member 92, is secured to the stamping 118 and to this clip there is attached the conductor, Figure 1, connected with one of the contacts, preferably the fixed contact of the clutch pedal operated breaker switch 84. Through an opening in the cover member 92 and an opening in that portion of the stamping 118 adjacent the projection 120 there extends a bolt 126.

Upon the end portion of this bolt extending through the stamping 118 there is threaded a nut 128 and a spring 130 is interposed between the underside of the cover member 92 and the top side of said stamping. A lock nut 132 may be threaded on the bolt, said nut contacting the top of a spool shaped bushing 134 mounted in the cover member 92 and provided with a bore which is threaded to receive said bolt. The bolt 126 therefore provides a means for determining the degree of gap between the fixed and movable contacts 122 and 110 when the switch is opened; for either a rotation of the bolt or a rotation of the nut 128 upon the bolt will serve to either compress the spring 130 or permit the same to expand, thereby changing the distance between the contacts 108 and 122 when in their switch open position.

Describing now the valve mechanism of the unit disclosed in Figures 6 and 7, the same comprises an irregular shaped valve support plate 136 extending crosswise of the unit and pivotally mounted upon a pin 138, the ends of which extend through the sides of the body member 90. One side of the plate 136 is turned up at 140 to provide an ear through which the pin 138 extends and the other side of said plate is turned up to provide the base portion of an arm 142 provided at its end with a laterally extending portion 144, Figure 7. The aforementioned second stage bleed valve member 33 is fixedly secured to the plate 136 and in its valve closed position contacts an annular portion 146 of the body member 90 constituting a valve seat. The valve plate 136 is held in its valve closed position by a valve spring 148. Both the valve member 33 and switch 86 are opened by a cam 150 pivotally mounted at its ends in the side walls of the body member 90 and shaped to provide flats 152 and 154 lying in different planes. A crank 156 is secured to a pin 158 extending from one end of the cam, said crank being connected to the accelerator 160 by the link 162, Figure 1.

A crank 164, also connected to the cam, is connected to a throttle operating crank 166 by a link 168, said link being slotted at 170 to insure an opening of the switch 86, Figure 7, before a throttle valve 172 is opened. A spring 174 serves to rotate the crank 166 to its throttle closed position when the accelerator is released. The function of this lost motion connection will be described in greater detail hereinafter.

Describing now the operation of the switch and valve unit, when the accelerator is in its released position the cam is moved, by an accelerator return spring 176, to its switch and valve closed position disclosed in Figures 6 and 7. As disclosed in Figue 7 the portion 144 of the arm 142 is then spaced a short distance from the flat 154 of the cam. The plate 136 is at this time held in its valve closed position by the spring 148 and the movable contact member is held in its switch closed position by the spring 116. The switch 86 being closed, the clutch control mechanism then functions to disengage the friction clutch providing of course the engine is idling to create a source of vacuum, the governor operated switch 88 is closed and the clutch pedal 20 is released to close the switch 84. To reengage the friction clutch below governor speed the driver then depresses the accelerator to open the switch 86 and open the valve 33.

Describing this operation of the switch and valve unit, when the accelerator is depressed the crank 156, which is directly connected to the accelerator by the link 162 is rotated clockwise, Figure 6, thereby rotating the cam 150. Now, inasmuch as one edge of the flat 152 is in contact with the bottom of the member 112 it follows that the clockwise rotation of the cam serves to rotate the contact member 96 in a counterclockwise direction, thereby opening the switch 86.

The opening of the switch 86 results in a deenergization of the solenoid 71, thereby permitting a spring 178 to move the armature 74 downwardly to the position disclosed in Figures 4 and 5. The valve member 76, which is connected to the armature 74, is thus moved to its valve closed position disclosed in Figures 4 and 5 and this operation of the valve initiates a clutch engaging operation of the motor unit 12 which operation is described hereinafter.

By continuing the depression of the accelerator the cam 150 is rotated sufficiently to take up the lost motion between the flat 154 and the member 144, Figure 7, and further depression of the accelerator results in a rotation of the cam, and a rotation of the arm 142 and plate 136, to open the second stage bleed valve member 33. The opening of this valve member results in a venting to the atmosphere of a compartment 180 of the clutch control motor unit. The air travels to said compartment via openings 182 in a plate 184 constituting the base of the valve and switch unit, compartments 186 and 188 in said unit which compartments may be filled with steel wool or other suitable air cleaning material, ports 190 and 192 in the body member 90, a compartment 194 of the unit which houses the above described switch and valve mechanism, a duct 196, a conduit 198 connected with the motor unit, ducts 200 and 202 in the valve body member 44, a compartment 204, the opening in the cupped portion of the member 78, a compartment 206, duct 208 and a duct 210.

There is thus provided in the switch and valve unit disclosed in Figures 1, 6 and 7 an accelerator operated means for in part controlling the operation of the clutch operating motor unit 12; for, assuming that the switches 83, 86 and 88 are closed and the engine idling, a release of the accelerator serves to effect a closing of the switch 84, thereby effecting a clutch disengaging operation of the motor unit. When the accelerator is depressed to open the throttle the first increment of movement of the accelerator results in an opening of the switch 84 to initiate a clutch engaging operation of the motor unit. As will be described in greater detail hereinafter, the first stage of this clutch engaging operation is automatically completed when the clutch plates contact with each other at a predetermined load and the second stage of this clutch engaging operation and opening of the throttle are, with a normal operation of the accelerator, initiated when the eccelerator has been depressed far enough to effect the movement of the throttle operating crank 166, Figure 1, that is, after the lost motion between the end of said crank and one end of the slot 170 in the link 168 has been taken up. In other words, the opening of the throttle and the concurrent operation of the second stage valve member 33 are initiated at the same or substantially the same time the first stage bleed valve 32 is closed.

Describing now the breaker switch 88 and the governor for operating the same, all disclosed in detail in Figures 8, 9 and 10, this mechanism, hereinafter referred to as a governor and switch unit, includes a cup shaped casing member 212 having an opening 214 in its base. A drive shaft housing member 214 is secured at its upper end to said casing member, a portion of said member extending through the opening 213. The member 214 may be threaded at 216 to provide means for securing the governor and switch unit to the chassis or any other convenient support.

The member 214 is bored to receive a governor drive shaft 218 having a gear member 220 secured to its lower end by a pin 222. The drive shaft 218 is journalled in bearings 224 and 226 which are grooved at 228 to receive a lubricant. To the upper end of the drive shaft there is secured a pin 230 telescoped within a cup shaped member 232. The lower end of the member 232 is provided with an outwardly extending flange 234 having portions thereof fitting within notches 236 and 238 in centrifugally operated weights 240 and 242 respectively, said weights being mounted on pins 244 and 246. These pins are secured at their ends to a stamping 248 U-shaped in cross section secured to the end of the driving shaft 218. A relatively thin plate 250 is fixedly mounted on the top of the housing member 214 and felt 252 or any other suitable air filter material is packed between the plate 250 and the bottom of the casing member 212. This filter is incorporated in the governor and switch unit for the purpose of cleaning the air which is drawn in via an opening 254 in the base of the casing member 212 into said casing. The filter absorbs any water which is admitted to the interior of the casing via the opening 254; for the operation of the centrifugal weights results in a partial vacuum being created within the unit and as a result air, water and dirt are drawn through the opening 252.

Figure 10:
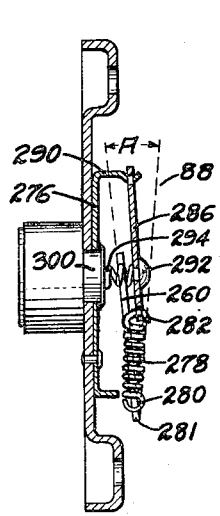
Figure 10 is a sectional view taken on the line 10—10 of Figure 9 disclosing certain details of the switch mechanism of Figure 8.
Figure 9:
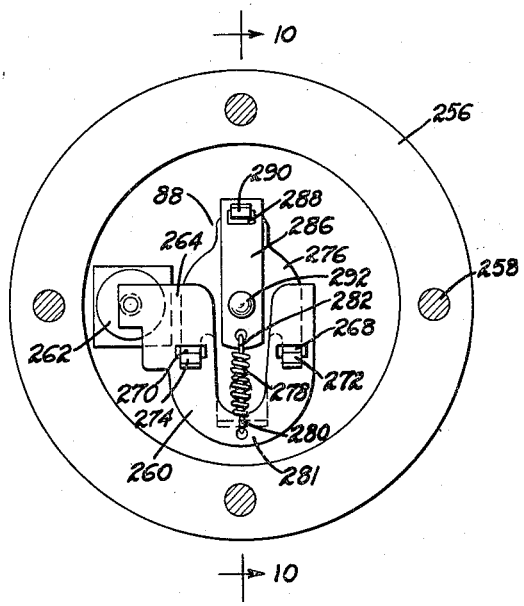
Figure 9 is a view looking in the direction of the arrows 9—9 of Figure 8 disclosing the switch mechanism of the governor and switch unit disclosed in Figure 8.
Figure 8:
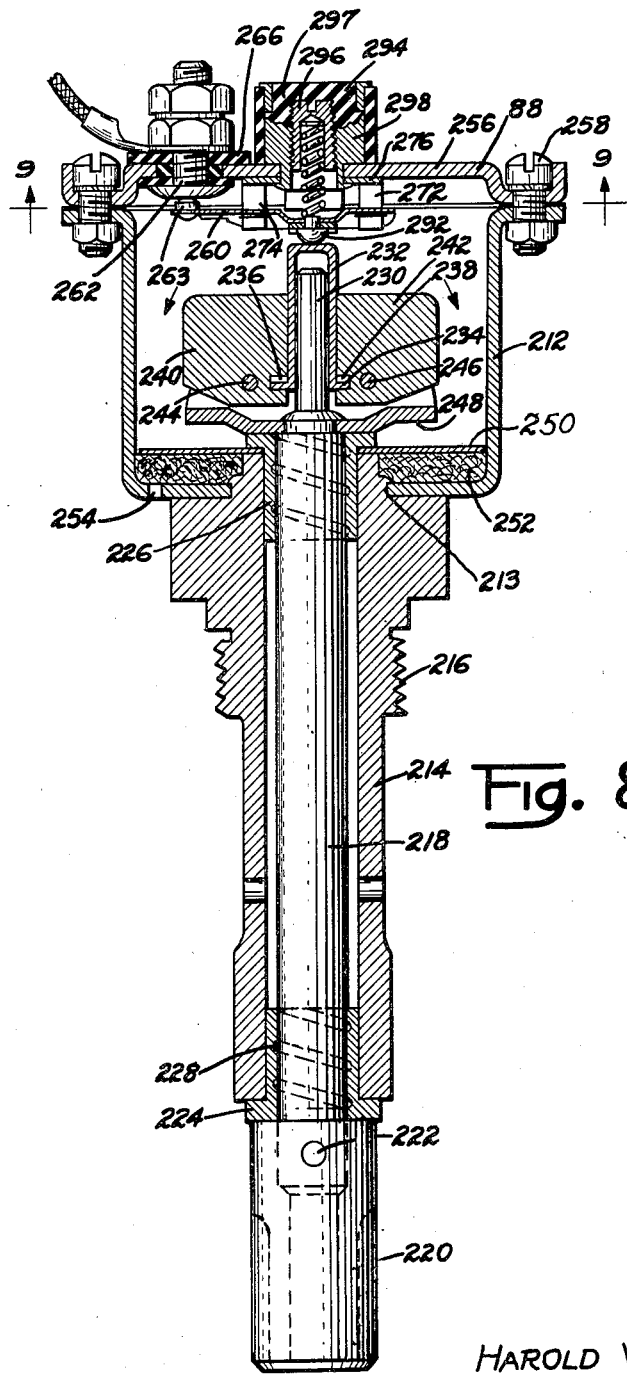
Figure 8 is a longitudinal sectional view disclosing details of the governor and governor operated switch mechanism constituting a part of the control mechanism of my invention.

Describing now the breaker switch mechanism disclosed in Figures 8, 9 and 10, the same is mounted on the inner side of a cover plate 256 of the governor and switch unit which plate is detachably secured, by fastening means 258, to the cup shaped casing member 212. The switch mechanism comprises a thin, flat U-shaped metal stamping 260, Figure 9, constituting the movable contact member of the switch and a metal bolt 262 constituting the fixed contact member of the switch. The movable contact which operates as a lever is provided with a metal tab 263 extending inwardly from one end portion of the stamping, said end portion being enlarged at 264 as clearly disclosed in Figure 10. The fixed contact 262 is insulated from its support by any suitable means 266 and is so provided with a metal tab 268 contactible by the tab 263. The U-shaped movable contact is provided with openings 268 and 270 and through these openings extend fulcrum members 272 and 274. The latter members are preferably rectangular in shape and slightly bent at their ends, thereby providing a fulcrum for the contact member 260 when said member is forced against the members 272 and 274 as it is being rocked to open and close the switch. The members 272 and 274 constitute an integral part of a stamping 276 which may be riveted to the inner surface of the casing member 256.

Describing the means for effecting the rocking action of the movable contact member, that is, the operation of said member when it functions as a lever, there is provided a coiled tension spring 278 having a hook 280 at one of its ends extending through an opening in a central part 281 of the U-portion of said contact member. The other end of the spring 278 is provided with a hook 282 which extends through an opening in one end of a rectangular shaped metal stamping 286. This stamping is preferably provided with a rectangular shaped opening 288 in its other end through which opening there extends a rectangular shaped support member 290. As with the aforementioned fulcrum members 272 and 274 the member 290 is an integral part of the stamping 276 and is slightly bent at its upper end to provide a groove to support the end of the stamping 286. The central portion of the stamping 286 is provided with an opening through which extends the shank portion of a yieldable member 292 made of any suitable non-conductive material such as synthetic rubber. One end of this member 292 is preferably rounded as disclosed in Figures 8 and 10 and is contacted by the aforementioned cup shaped member 232. A coiled compression spring 294 is sleeved, at one of its ends, over the shank of the member 292 and at its other end is fitted within a screw 296 bored to receive said spring. This screw is threaded into a cylindrically shaped member 298 fixedly secured to the casing member 256 by means of a cylindrical portion 300 extending through an opening in the casing member 256 and bent over at its end to provide means not only to clamp the member 298 in place but also to secure the stamping 276 in place.

Describing now the operation of the governor and the breaker switch operated thereby, it will be noted as disclosed in Figure 10, that when the tension spring 278 extends in a line forming an acute angle A with the plane of the U-shaped movable contact member 260, then said spring exerts a force having a component which lifts the end portion of said contact member upwardly, that is away from the plane of the casing member 256. This condition results in the holding of the contact tabs 263 and 262 in engagement with each other to maintain the switch closed, and the switch remains closed when the car is at a standstill or is travelling below the higher of two critical governor speeds, say thirteen miles per hour, as the speed of the vehicle is being increased. Until this critical speed is reached the governor mechanism does not force the cup shaped member 232 upwardly far enough to move the member 292 and the stamping 286 connected thereto. To effect a closing of the switch the compression spring 294 forces the movable end of the stamping 286 downwardly to the position disclosed in Figure 10 in which position the contact member 260 and spring 278 are out of alinement with each other as disclosed by the angle A in said figure.

When the vehicle speed is being increased and is approaching the aforementioned critical upshift speed of 13 M. P. H., the governor weights 240 and 242 rotate about the pins 244 and 246 in the direction of the arrows shown in Figure 8 thereby forcing the member 232 upwardly to compress the spring 294 and move the spring 278 into alinement with the movable contact member 260. When the aforementioned critical vehicle speed is attained spring 278 is positioned very slightly beyond dead center with respect to the contact member 260; then the longitudinal axis of said spring lies in a plane forming a very small acute angle with the plane of said contact member. The spring then exerts a force having a component tending to pull the portion 281 of the contact member toward the plane of the casing member 256. The contact member acting as a lever is by this operation rocked with a snap action about its fulcrum to open the switch. Upon decreasing the vehicle speed to the critical downshift speed of, say 10 M. P. H., the force exerted by the centrifugal weight driven member 232 is reduced and the spring 294 expands, returning the spring 278 and stamping 286 to their positions shown in Figure 10; and this results in the rocking of the movable contact member about its fulcrum to again close the switch. It is to be noted that due to static friction and other causes, there is a differential of approximately 3 M. P. H. in the aforementioned critical governor speeds; however, this is a desirable feature of the switch mechanism of my invention, inasmuch as such a mechanism is free of the undesirable hunting operation of a breaker switch. By adjusting the setting of the screw 296 with the consequent variation of the loading of the compression spring 294 the critical governor speeds may be varied as desired. To make this adjustment it is necessary to remove a protective packing 297 of wax or other suitable material.

Describing now one of the most important features of my invention, there is provided in addition to the grounded governor operated switch 88, a grounded selector lever operated switch 302, wired in parallel with said governor operated switch, for in part controlling the operation of the clutch control motor unit 12. The change-speed transmission 26 disclosed in Figure 1 is operated by a manually operated selector lever 304 and said lever also serves to operate the aforementioned switch 302 when the lever is moved to operate the transmission. Describing this operation of the switch 302 when the driver exerts a slight pressure on the selector lever 304 to initiate the gear selecting movement of said lever the switch is closed completing an electrical circuit to energize the three-way valve operating solenoid 71. As previously described the motor 12 is thus energized to effect a disengagement of the friction clutch and the parts of the mechanism are so constructed and arranged and so operative that this occurs before the selector lever is moved sufficiently to demesh the gears of the transmission.

Continued movement of the selector lever then effects a meshing of the gears to establish the transmission in the desired gear setting and when the driver removes his hand from the selector lever the switch 302 is opened thereby opening the aforementioned electrical circuit which initiates a clutch engaging operation of the motor 12; more particularly initiates the operation of the first stage valve 32.

The details of the selector operated switch 302 constitute no part of my invention; accordingly, the specific construction of said switch is not covered by the subjoined claims. My invention does, however, include said switch as one element of the mechanism constituting the invention, said switch being so constructed as to be closed when a relatively low pressure is exerted upon the selector lever and prior to the operation of the transmission. It therefore follows that the switch 302 is so constructed that the same does not open until the driver removes his hand from the selector lever, that is, when the same is not subjected to any force. It will also be apparent that the removal of the driver's hand from the selector lever after the transmission has been operated merely initiates the first stage clutch engaging operation of the motor 12 and that the completion of the clutch engaging operation of said motor is effected by the throttle and second stage bleed valve opening movement of the accelerator, all as described hereinafter. It should also be noted that the hereinafter described fixed bleed opening 306 in a conduit 308, Figure 2, serves to prevent an undesired slipping of the clutch and insure an eventual completion of the engagement of the clutch should the driver neglect to depress the accelerator and neglect to remove his hand from the selector lever after said lever has been moved to operate the motor 12 and effect a new setting of the transmission.

Describing now the complete operation of the clutch control mechanism of my invention and incidentally completing the description of said mechanism, when the accelerator 160 is completely released to close the switch 86, the clutch pedal 20 is in its released position to close the switch 84 and either the selector lever 304 is moved to close the switch 302 and set the transmission in gear or the vehicle is either at a standstill or is travelling at or below the critical governor speed to thereby effect a closing of the switch 88, then the valve operating solenoid 71 is energized. This operation results in the armature 74 being drawn upwardly, against the tension of the spring 178 to seat the valve member 76 upon the flange 80, Figure 5. The clutch control motor unit 12 is then energized; for a compartment 310 of said unit is permanently vented to the atmosphere and the compartment 180 of said unit is at this time connected with the intake manifold of the engine via ducts 210 and 208, Figure 5, in the valve body member 44, the valve compartment 206 outlined by the member 78 and the upper surface of the body member 44, ducts 312 and 314, in the member 44, a nipple 316 fitted within the duct 314 and a flexible conduit 318 connected with the intake manifold of the engine. The power element or diaphragm 19 of the motor unit is thus subjected to a differential of pressures resulting in its movement to the dotted line position disclosed in Figure 2 in which position the friction clutch is disengaged, that is the driven clutch plate is moved away from the driving clutch plate against the tension of the clutch spring.

Describing now in greater detail the clutch engaging operation of the motor unit 12, when the electrical circuit including the solenoid winding 72 is broken by the opening of any one of the switches 302, 86 or 88, then the solenoid 71 is deenergized. The spring 178 acting on the solenoid armature 74 then expands, thereby moving said armature and the valve member 76 connected thereto downwardly to seat said valve member at 320, Figure 5. This closing operation of the valve member 76 results in a venting of the compartment 180 of the motor unit to the atmosphere via a hollow nipple 322, Figure 2, mounted in the valve casing member 50, a compartment 324 outlined by the diaphragm 56 and said casing member 50, ducts 200 and 202 in the valve body member 44, the valve compartments 204 and 206 and the aforementioned ducts 208 and 210, the latter leading to the motor compartment 180.

As will be described hereinafter this air transmitting circuit is made possible by virtue of the fact that the valve operating diaphragm 56 is moved to the left, Figure 4, against the tension of the spring 62 to move the valve member 60 away from a seat 326, when the motor unit is energized; for when said unit is energized a compartment 328 of said unit is partially evacuated by virtue of the conduit 308 which interconnects said compartment 328 with the compartment 180 of the unit. It follows therefore that when the compartment 180 is partially evacuated the compartment 328 is to the same degree evacuated and this results in the aforementioned movement of the diaphragm 56, and the valve member 60 connected thereto, to the left to unseat said valve.

The compartment 324 is at all times vented to the atmosphere by the hollow nipple 322; accordingly, when the compartment 328 is partially evacuated the diaphragm 56 is subjected to a differential of pressures resulting in the aforementioned movement of said diaphragm.

One of the important features of the clutch control mechanism of my invention lies in the means for controlling the clutch engaging operation of said mechanism and completing the description of this operation, as stated above, the valve 30 is at this time, that is, immediately after the solenoid 71 is deenergized, closed by the seating of valve member 76 on the seat 320, and the valve member 60 is positioned away from the seat 326.

Air then rushes into the motor compartment 180 from the nipple 322 via the above described air transmitting circuit and this action results in the initiation of a movement of the diaphragm 10 to the right, Figure 2, toward its clutch engaged position shown in full lines in said figure, the clutch spring then functioning as a source of power. This operation immediately results in the maintenance of a partial vacuum in the motor compartments 180 and 328, and the maintenance of the diaphragm 56 and the first stage valve member 60 connected thereto in their valve open positions; and the valve member 60 remains in this open position as long as the clutch spring is with full force pulling the diaphragm 10 to the right, Figure 2, to thereby maintain the partial evacuation of the compartments 180 and 328.

Now when the clutch plates contact at a certain load the pulling force of the clutch spring is reduced and this operation results in a seating of the valve member 60.

Explaining this operation of the mechanism, it is to be remembered that the compartments 180 and 328 are at the time vented to the atmosphere; accordingly, when the vacuum creating movement of the diaphragm 10 is checked by the contacting of the clutch plates, the air continues to rush into said compartments with the result that the spring 62 then functions to seat the valve member 60 and cut off the flow of air into said compartments. At this juncture it is to be observed that the time of closing of the valve member 60 and the degree of loading of the clutch plates when the movement of the diaphragm 10 is checked, is determined by the loading of the spring 62; accordingly, the initial loading of the clutch plates and the resultant initial acceleration of the vehicle is determined by the adjustment of the screw 68.

Now all of the above described clutch engaging operations of the parts of the motor unit to effect the first stage of clutch engaging movement of the power element are, with a normal operation of the accelerator, completed at the same or substantially the same time that the opening of the throttle and the bleed valve 342 is initiated; for as previously described the first increment of movement of the accelerator effects an opening of the switch 84 and this operation initiates the aforementioned first stage operation of the motor unit. Continued depression of the accelerator opens the throttle thereby increasing the torque of the engine and the resultant driving force of the driving clutch plate, and this operation of the accelerator also opens the bleed valve 33 thereby providing the heretofore described supplementary source of air for the compartment 180 of the motor unit. Now the degree of opening of the bleed valve 33 determines the rate of flow of air into the compartment 180 with the resultant progressive increase of the clutch plate loading. There is thus provided in the accelerator operated bleed valve, means cooperating with the throttle for determining the rate of increase of the acceleration of the vehicle, said rate of increase being determined by the mode of operation of the accelerator as the same is depressed. As described above, the conduit 308 may be provided with a small bleed opening 306, thereby providing a source of air for the motor compartment 180 which supplements the air to said compartment admitted via the second stage bleed valve 33. If perchance the driver merely depresses the accelerator only a slight distance to open the bleed valve 33 or fails, for an abnormal period of time, to open the throttle at all, then the air admitted to the compartment 180 via the opening 306 will result in an increase in loading of the clutch plates and thereby prevent a slipping of the clutch.

It is to be noted here that by constructing the mechanism of Figure 1 so that with a normal operation of the accelerator the opening of the throttle and bleed valve is timed to occur at the time when or immediately after the clutch plates first contact with each other, there is provided a mechanism which cooperates well with the fluid clutch of the power plant to effect a smooth start of the vehicle from rest or a speeding up of the vehicle when the friction clutch is reengaged by depressing the accelerator; for the fluid clutch, by virtue of its being a yieldable force transmitting medium, will prevent the engine from being stalled both before and after the second stage bleed valve is opened. If, perchance the first stage bleed valve fails to close at the proper time or fails to close at all, then the fluid clutch will, by virtue of a slipping action, prevent a stalling of the engine; and if the driven after a slight opening of the bleed valve 33 fails to continue the depression of the accelerator to increase the engine torque, then the fluid clutch will again prevent the engine from stalling. If the clutch control motor unit is provided with the fixed bleed opening 306 and the driver fails to open the bleed valve 33 then the fluid clutch will prevent the engine from stalling as the clutch plate loading is increased.

There is thus provided, in the clutch control mechanism of my invention, means cooperating with the fluid clutch to insure the desired acceleration of the vehicle after an operation of the transmission has been effected; and there is provided by the mechanism of my invention means for operating the friction clutch, fluid clutch and transmission, said mechanism including but three controls, namely, the accelerator, clutch pedal and selector lever, but two of said controls being operated after the engine is started. This mechanism, that is, the combination of an accelerator controlled internal combustion engine, an accelerator controlled fluid clutch, a selector lever controlled selective transmission and an accelerator, governor and selector lever controlled two stage friction clutch operating motor, effects the desired operation of the power plant with but a minimum of controls, the vehicle being started from rest smoothly and its speed increased after the operation of the transmission without jerking the vehicle.

Referring now to Figure 11 there is diagrammatically disclosed in this figure the above described clutch control mechanism in combination with one of the kickdown transmission mechanisms of the day said kickdown mechanism having been incorporated in certain makes of 1941 cars. The mechanism disclosed in Figure 11 is the same as that shown in Figure 1 together with the kickdown transmission mechanism, the manually operated change speed transmission 26 of Figure 1 being supplanted in Figure 11 by the transmission 27 of said mechanism. Parts of the mechanism in Figure 11 which duplicate the same parts in Figure 1 are given the same reference numeral with the addition of a prime.

Briefly describing the kickdown transmission mechanism of Figure 11 the change speed transmission unit 27 includes mechanism operable by cranks 326, 328, and 330 extending from the casing of the said unit. The cranks 326 and 328 are connected by suitable linkage with a shift lever 304' mounted beneath the steering wheel of the vehicle. The parts of this linkage and the transmission mechanism 27 are preferably so constructed and arranged that to establish the transmission in reverse gear the driver first lifts up the shift lever, that is rotates the same in a plane perpendicular or substantially perpendicular to the plane of the steering wheel, and then rotates said lever in the plane of the steering wheel to its reverse gear position. This operation serves to rotate the crank 326.

Now to effect a forward speed setting of this particular type of well known kickdown transmission mechanism the driver has the choice of moving the crank 328 to either its low range position or to its high range position; and this is accomplished by rotating the shift lever 304' in a plane parallel to the plane of the steering wheel to one or the other of two positions. Preparatory to getting the car under way the driver will probably move the shift lever to its low range position. Now at this time, that is with the engine idling and the car at rest, the friction clutch, preferably located to the rear of a fluid coupling 331 of the kickdown mechanism, is disengaged by virtue of the above described operation of the clutch operating motor 12'; and the transmission 27 is established in its kickdown setting. This operation of the transmission is effected by a spring operation of a vacuum and spring operated motor 332 similar to that disclosed in the U. S. patent to Dunn No. 2,257,674 the power element 333 of said motor being operably connected to the crank 330 by a link 334.

Briefly describing the kickdown motor 332 and its operation said motor includes a compartment 335 outlined by the power element 333 and parts of the motor casing. The gaseous pressure within this compartment is controlled by a solenoid and spring operated three-way valve, not shown. When the valve operating solenoid, indicated by the reference numeral 338, is deenergized this valve is opened by a spring, not shown, thereby connecting the compartment 335 with the intake manifold of the engine; and this operation serves, when the accelerator is released sufficiently to effect a certain degree of manifold vacuum, to energize the motor 332 thereby rotating the crank 330 to move the same to its upshift position. Now if the crank 328 is at the time in its low range position, then the transmission by this vacuum operation of the kickdown motor 332 is established in its high, low range setting. When the valve operating solenoid 338 is energized this operation serves to close the three-way valve thereby venting the compartment 335 to atmosphere; and when this occurs a spring 339 within said compartment serves to expand to move the crank 330 to its kickdown position. The spring 339 is cocked, that is compressed, when the motor 332 is energized by vacuum. Now if the crank 328 is in its low range position then the transmission by this kickdown operation of the motor 332 is established in the low, low range setting. The spring or kickdown operation of the motor 332 is facilitated by a momentary interruption of the ignition system of the engine.

Describing now the ignition controlling electrical means, an interrupter switch 327, housed within the motor 332 and operated by a rod connected to the power element 333 of said motor is wired in series with a grounded accelerator operated switch 340 and the primary coil 341 of the ignition coil 342 of the ignition system. The distributor of this ignition system is diagrammatically disclosed in Figure 11 and is indicated in general by the reference numeral 343. This distributor which is of conventional design includes, of course, a grounded condensor 334, a breaker switch 345 and a rotor 346 wired to the several grounded spark plugs only one of which is disclosed. As disclosed in Figure 11, the interrupter switch 327 is also wired in series with a grounded governor operated switch 347. This switch also serves as a part of the clutch control mechanism which has previously been described and differs only from switch 88 of Figure 1 in that at or below governor speed the grounded movable contact of the switch moves into contact with two fixed contacts, one wired to the valve operating solenoid of the clutch control motor and the other wired to the solenoid 338 and ignition interrupter switch 327 of the kickdown motor 332.

Completing the description of the ignition system disclosed in Figure 11 the primary coil 341 of an ignition coil 342 is wired in series with the ignition switch 83' of the system, a grounded battery 82' and the breaker switch 345 of the distributor; and the secondary winding 350 of the ignition coil is wired in series with the rotor 346, the ignition switch and the grounded battery.

Completing the description of the electrical means of the kickdown transmission mechanism of Figure 11 the aforementioned valve operating solenoid 338 of the kickdown motor unit 332 is wired in series with the ignition switch 83', the grounded battery 82' and the grounded accelerator operated switch 340; and said solenoid is also wired in series with the grounded governor operated switch 347, the ignition switch and the battery. When the solenoid 338 is energized, by either bringing the vehicle speed down to or below governor speed to thereby close the switch 347 or by closing the switch 340 by depressing the accelerator to its wide open throttle position, then the three-way valve of the motor unit 332 is operative to effect a kickdown operation of said unit; and when the solenoid 338 is deenergized, by an opening of both the switches 347 and 340, then said valve is operative to effect an upshift operation of said motor.

The parts of the mechanism disclosed in Figure 11 having been described the description of the cycle of operations of said mechanism will be continued. The transmission having been established in its low, low range setting, the driver to get the vehicle under way depresses the accelerator to effect a clutch engaging operation of the motor 12' and an opening of the throttle; for it will be remembered, as described above, that the clutch operating motor 12', when the car is at rest and the accelerator is released, is energized to disengage the friction clutch. Now the aforementioned 1941 cars equipped with a kickdown transmission mechanism are also equipped with a fluid coupling constituting a part of said mechanism accordingly there is included in the power plant disclosed in Figure 11 the aforementioned coupling 331 which is of conventional construction; and this coupling, as previously described, cooperates with the friction clutch control mechanism to effect the desired acceleration of the vehicle.

The car being now under way in the low, low range setting of the transmission is accelerated until its speed is such as to operate the governor to open the switch 347 thereby effecting a deenergization of the solenoid 338 with a resultant opening of the control valve of the motor unit 332. This motor unit 332 is then energized by vacuum when the accelerator is released to close the throttle to create sufficient vacuum in the intake manifold; and this energization of the unit 332 effects an upshift operation of the transmission 27 to establish the same in its high, low range setting. This operation of the motor unit 332 is facilitated by the slipping operation of the fluid coupling. Should the driver now desire to increase the speed of the vehicle with the transmission established in this high, low range setting he merely has to depress the accelerator to further open the throttle. With normal driving the driver will probably then wish to establish the transmission in its high range setting and to effect this operation he need but first release the accelerator to close the switch 86' and then move the shift lever 304' to its high range position. The friction clutch is then disengaged by power and the transmission established in its high range setting in the order named this shift lever controlled operation of the clutch control mechanism having been previously described. The accelerator is then depressed to reengage the clutch and accelerate the vehicle.

Should the driver wish to quickly pass a car on the road or maintain the car speed upon reaching the foot of a hill he will effect a kickdown operation of the motor 332 by depressing the accelerator 160' to its wide open throttle position. The switch 340 is then closed this operation being effected when a stop 352, fixedly connected to the accelerator operated link 168', is moved to rotate a crank 354 which operates the switch 340. The switch 340 is not closed, however, until after the lost motion at 170' is taken up and the throttle is in its wide open position. A spring 356, constituting a part of the force transmitting means interconnecting the accelerator with the throttle, will yield after the throttle is fully opened and during the rotation of the crank 354 to close the switch 340.

Now as previously described the closing of the switch 340 effects a kickdown operation of the motor 332 and this operation is facilitated by the momentary interruption of the ignition system. Describing this operation the initial movement of the power element 333 of the motor 332 serves, by virtue of the movement of the switch operating rod connected to the power element, to close the ignition interrupter switch 327; and after said rod has been moved a slight distance the switch 327 is again opened. During the slight movement of the rod the switch 327 remains closed the ignition system is disabled to facilitate the kickdown operation of the transmission; and when the switch 327 is opened, which occurs at the same or substantially the same time that the remeshing operation of the transmission is completed, then the normal operation of the ignition system is resumed. This momentary interruption of the ignition system or so-called engine torque reversal operation is additive to the slipping operation of the fluid coupling 331 in facilitating the kickdown or downshift operation of the transmission 27. The transmission having now been established in its low, high range setting the driver will maintain the accelerator depressed sufficiently to attain or maintain, as the case may be, the car speed desired. He will then release the accelerator to again effect an upshift operation of the motor 332, all as previously described.

When the car comes to a stop the transmission 27 is automatically established in its kickdown setting regardless of the range setting of the transmission; for the governor operated switch 347 then functions, when the critical relatively low car speed or governor speed is reached, to initiate the kickdown operation of the motor 332.

There is thus provided, by the above described particular type of kickdown mechanism in combination with the clutch control means of my invention a very simple and effective power plant of an automotive vehicle. This power plant includes but three manually operated controls, that is a clutch pedal, an accelerator and a shift lever. Under normal driving conditions there is no need to use the clutch pedal of this mechanism; for with the transmission established in either its low, low range or low, high range setting and the car standing on a hard surface there is no need, by virtue of the slipping operation of the fluid coupling, to manually disengage the friction clutch prior to starting the engine even though the transmission is in gear. And it may be added that with this mechanism the driver may, to drive the car forwardly on relatively level ground which is relatively dry and hard, dispense with an operation of the shift lever after the transmission is established in its high range setting. There is then but one control to operate, that is the accelerator. The fluid coupling 331 of the mechanism of Figure 11 cooperates with the clutch control in effecting the desired acceleration of the vehicle when the friction clutch is being engaged and said coupling also cooperates with the kickdown motor 332 in its operation of the transmission. As to the clutch control mechanism said mechanism except under unusual conditions dispenses with a manual operation of the friction clutch; and a disengagement of the latter is necessary prior to effecting any one of the reverse gear, low range, high range and transmission neutral settings of the transmission. The accelerator controls the throttle, the fluid coupling, the clutch control motor and the kickdown motor and the shift lever of the mechanism controls both the transmission and the clutch control motor.

Now the above described kickdown transmission mechanism, that is that disclosed in Figure 11, includes a fluid coupling in combination with a kickdown transmission mechanism the latter being selectively operable, by a manually operated shift lever, to establish the transmission in any one of a reverse gear, transmission neutral, low range or high range setting. This transmission is also operated, by a kickdown spring and vacuum operated motor, to effect either a kickdown operation of the transmission or an upshift operation thereof. Applicant is not however limiting his invention to the use of only one type of kickdown mechanism of the day in combination with the clutch operating power means disclosed in Figure 1 of the drawings; for other kickdown mechanisms of the day include a power and manually operated transmission, the manually operated shift lever of said mechanism serving to selectively establish the transmission in any one of a transmission neutral setting, a mud gear, that is relatively low gear ratio setting, a reverse gear setting and an automatic setting. In this type of kickdown mechanism the kickdown motor unit of Figure 11 serves, after the shift lever has been operated to establish the transmission in its aforementioned automatic setting, to effect either an upshift setting or a kickdown setting of the transmission.

It follows therefore that the kickdown mechanism disclosed in Figure 11 may be either one or the other of the above described types of this mechanism; for both mechanisms employ the three cranks 326, 328 and 330, the first two being manually operated by an operation of the shift lever 304' and the latter operated by the kickdown motor unit 332. The crank 326 with both types of kickdown mechanism is operated to establish the transmission in its reverse gear setting and the crank 328, in the last described kickdown mechanism, is operable to establish the transmission either in its mud gear setting or an automatic setting preparatory for the operation of the motor 332.

At this juncture it is also to be particularly stressed that applicant's invention is not limited to a kickdown transmission mechanism employing a fluid coupling; for this coupling may, with the inclusion of a friction clutch and applicant's power means for operating the same, be omitted from the combination. The combination of a kickdown mechanism of either of the above types, and a power operated friction clutch controlled in part by a shift lever, provides a very effective portion of an automotive power plant; for the automatic disengagement of the friction clutch, both when bringing the car to a stop and with an operation of the shift lever to operate the transmission, facilitates the operation of the transmission by said shift lever. As to the operation of the kickdown motor 332 its two operations are, of course, facilitated by an operation of the fluid coupling if such a coupling is present in the power plant however the ignition interruption to facilitate the kickdown operation of said motor and the release of the accelerator to reverse the engine torque and slow the engine down to transmission meshing synchronous speed, facilitates the upshift operation of said motor.

The mechanism covered by this application is in part disclosed in my copending application Serial No. 442,465 filed May 11, 1942; accordingly this application constitutes a continuation in part of the latter application.

While one illustrative embodiment has been described, it is not my intention to limit the scope of the invention to that particular embodiment, or otherwise than by the terms of the appended claims.

I claim:

1. In an automotive vehicle provided with a power plant including a throttle, an accelerator, a friction clutch, a shift lever positioned adjacent the steering wheel of the vehicle and a change-speed transmission; means for operating said clutch and transmission comprising a two-stage fluid pressure operated motor for operating the clutch, a motor for operating a part of the transmission, valve means for controlling the operation of the clutch operating motor, valve means for controlling the operation of the transmission operating motor, accelerator operated means, including two separate switches serving as part of the means for controlling the operation of both of said valve means, and means, including a switch and transmission operating force transmitting means, actuated by the shift lever and operative to in part control the operation of both the transmission and the clutch operating motors; the parts of said mechanism being so constructed and arranged and so operative that with a release of the accelerator and a transmission operating movement of the shift lever there results an operation of a part of the first mentioned valve means and a subsequent energization of the clutch operating motor to disengage the clutch; the parts of the mechanism being also so constructed and arranged that with a certain operation of the shift lever and a depression of the accelerator there results a clutch engaging operation of the clutch operating motor in two stages, the parts of the mechanism being also so constructed and arranged that the transmission operating motor is energized to effect a certain setting of the transmission when the accelerator is depressed beyond its full throttle open position.

2. In an automotive vehicle provided with a steering wheel, an accelerator, a friction clutch and a change speed transmission mechanism including a kickdown mechanism, a motor for operating the kickdown mechanism of said transmission mechanism, valve means for controlling the operation of said motor, a two stage fluid pressure operated motor for operating said clutch to facilitate certain operations of the transmission, valve means for controlling the operation of said latter motor and means for controlling the operation of both of the aforementioned valve means and for operating a part of the transmission mechanism, said control means comprising accelerator operated means and further comprising a manually operated shift lever and switch means directly actuated by said lever; the parts of said mechanism being so constructed and arranged that a part of the accelerator operated means and the switch means actuated by the shift lever cooperate to control both the disengagement of the clutch and the engagement thereof, the parts of said mechanism being also so constructed and arranged and so operative that the accelerator and shift lever constitute common controls for both the transmission mechanism and the clutch control mechanism.

3. In an automotive vehicle provided with a power plant comprising an engine throttle, a friction clutch, a fluid coupling and a change speed transmission including a kick-down mechanism, said coupling cooperating with the clutch to effect a smooth start of the vehicle from rest and facilitating an upshift operation of the kickdown mechanism of the transmission; means for operating both the clutch and transmission comprising a two stage fluid pressure operated motor for operating the clutch, a motor for effecting either a kickdown or an upshift operation of the kick-down mechanism of the transmission and means for controlling the operation of said clutch and transmission operating means including a switch mechanism, a throttle operating member operably connected to said switch mechanism, a manually operated transmission controlling shift lever mounted adjacent the steering wheel of the vehicle and a clutch control switch associated with said shift lever said switch being closed incidental to a transmission operating operation of said lever; the parts of said control means being so constructed and arranged and so operative that the throttle operating member and shift lever together constitute means for controlling the operation of both the transmission and clutch, said parts being also so constructed and arranged and so operative that to effect a disengagement of the clutch, incidental to an operation of the shift lever to operate the transmission, the accelerator is released and the shift lever is moved to operate the transmission, and to effect a two stage engagement of the clutch the shift lever is operated in a certain manner and the accelerator is depressed.

4. In an automotive vehicle provided with a throttle, a friction clutch and a change-speed transmission, means for operating said clutch and transmission comprising a two-stage fluid pressure operated motor for operating the clutch, a motor constituting a part of the transmission operating means and means for controlling the operation of the clutch and transmission operating means comprising a manually operated shift lever mounted adjacent the steering wheel of the vehicle, switch means actuated by said lever and constituting a part of the means for controlling the operation of the aforementioned clutch operating motor, a manually operated throttle operating means and switch means operated by said throttle operating means and constituting a part of the means for controlling the operation of both of the aforementioned motors; the parts of the aforementioned mechanism being so constructed and arranged and so operative that to disengage the clutch, incidental to the operation of the shift lever to establish the transmission in any one of a plurality of settings, the accelerator is released and the shift lever is operated in a certain manner, and to then engage the clutch in two stages after the latter operation of the transmission has been completed, the shift lever is operated in a certain manner and the throttle operating means is depressed, a part of said depression of said means serving to so operate the means operated thereby as to effect the second that is last stage of clutch engaging operation of the clutch operating motor.

5. In an automotive vehicle provided with an accelerator, a friction clutch, a change speed transmission and a shift lever mounted adjacent the steering wheel of the vehicle, means for operating the clutch and transmission the clutch being disengaged to facilitate an operation of the transmission and also to enable the transmission to be left in gear when the vehicle is brought to a stop with the engine idling, said clutch and transmission operating means comprising a two stage fluid pressure operated motor for operating the clutch and a fluid pressure operated motor for operating a part of the transmission, valve means for controlling the operation of the clutch operating motor, valve means for controlling the operation of the transmission operating motor, accelerator operated means, including a lost motion connection means interconnecting the throttle and accelerator, for in part controlling the operation of both of said valve means, and means, including a switch and transmission operating force transmitting means, actuated by the shift lever and operative to in part control the operation of the transmission and in part control the operation of the clutch operating motor; the parts of said mechanism being so constructed and arranged and so operative that with a release of the accelerator and a transmission operating movement of the shift lever there results an operation of a part of the first mentioned valve means with a resultant energization of the clutch operating motor to disengage the clutch, the parts of the mechanism being also so constructed and arranged that with a certain operation of the shift lever and a depression of the accelerator there results a clutch engaging operation of the clutch operating motor in two stages, the first stage of operation being effected as the aforementioned lost motion connection is being taken up in the accelerator to throttle connection and before the throttle is opened, the second stage of operation being effected as the throttle is being opened; the parts of the mechanism being also so constructed and arranged that the transmission operating motor is energized to effect a certain setting of the transmission when the accelerator is depressed beyond its full throttle open position.

6. In an automotive vehicle provided with an accelerator, a friction clutch and a change speed transmission; means for operating the transmission and clutch comprising a two stage fluid pressure operated motor for operating the clutch, a fluid pressure operated motor for operating a part of the transmission and means for controlling the operation of said clutch and transmission operating means comprising valve means for effecting the two stage clutch engaging operation of the aforementioned clutch operating motor, valve means for controlling the operation of the aforementioned transmission operating motor, means, operated by the accelerator, for in part controlling the operation of the clutch control motor valve means, means, also operated by the accelerator, for controlling the operation of the control valve for the transmission operating motor, a manually operated shift lever, means, operated by said lever for in part controlling the operation of the clutch control motor valve means, and means operated by said lever for supplementing the operation of said transmission operating motor in the operation of the transmission; the parts of the aforementioned mechanism being so constructed and arranged and so operative that with a certain operation of the controls the clutch control means operated by the shift lever cooperates with the accelerator operated clutch control means to effect the two stages of clutch engaging operation of the clutch motor said operation being effected by a normal throttle opening depression of the accelerator, the parts of the aforementioned mechanism being also so constructed and arranged that when the accelerator is depressed beyond its full throttle open position then the transmission operating motor is energized to effect a certain operation of the transmission.

7. In an automotive vehicle provided with a throttle, a friction clutch, a fluid coupling and a change-speed transmission, means for operating said clutch and transmission comprising a two-stage fluid pressure operated motor for operating the clutch, a fluid pressure operated motor constituting a part of the transmission operating means and means for controlling the operation of the clutch and transmission operating means comprising a manually operated shift lever mounted adjacent the steering wheel of the vehicle, switch means associated with said lever and constituting a part of the means for controlling the operation of the aforementioned clutch operating motor, a manually operated throttle operating means, means, including a switch mechanism, operated by said throttle operating means and constituting a part of the means for controlling the operation of both of the aforementioned motors; the parts of the aforementioned mechanism being so constructed and arranged and so operative that to disengage the clutch, incidental to the operation of the shift lever to establish the transmission in any one of a plurality of settings, the accelerator is released and the shift lever is operated in a certain manner, and to then engage the clutch in two stages, after the latter operation of the transmission has been completed, the shift lever is operated in a certain manner and the throttle operating means is depressed, a part of said depression of said means serving to so operate the means operated thereby as to effect the second, that is, last stage of clutch engaging operation of the clutch operating motor.

8. In an automotive vehicle provided with a power plant including an accelerator, a friction clutch, a fluid coupling, and a kick-down transmission mechanism including a kick-down mechanism and a manually operative selectively operable means; a motor for actuating the kick-down mechanism of the transmission, a manually operated transmission and clutch controlling selector lever serving in part to actuate the aforementioned selectively operable means of the transmission, power means, including a stage type of pressure differential operated motor, for operating the friction clutch, valve means for controlling the operation of said clutch operating motor, valve means for controlling the operation of the motor for operating the kick-down mechanism, and means for controlling the operation of both of said valve means including a switch actuated by the selector lever and serving to control the operation of the valve for controlling the clutch operating motor and further including switch means actuated by the accelerator and serving to control both of said valve means.

HAROLD W. PRICE.

REFERENCES CITED

The following references are of record in the file of this patent:

UNITED STATES PATENTS

| Number | Name | Date |
|---|---|---|
| 1,844,631 | Bragg et al. | Feb. 9, 1932 |
| 2,049,738 | Hill et al. | Aug. 4, 1936 |
| 2,051,606 | Jacobs | Aug. 18, 1936 |
| 2,078,174 | Brewer | Apr. 20, 1937 |
| 2,095,763 | Price et al. | Oct. 12, 1937 |
| 2,169,216 | Bloxsom | Aug. 15, 1939 |
| 2,175,179 | Caserta | Oct. 10, 1939 |
| 2,183,244 | Misterly et al. | Dec. 12, 1939 |
| 2,206,586 | Struck | July 2, 1940 |
| 2,216,466 | Brewer | Oct. 1, 1940 |
| 2,229,319 | Wesselhoff | Jan. 21, 1941 |
| 2,280,002 | Neracher | Apr. 14, 1942 |
| 2,296,282 | Hruska | Sept. 22, 1942 |
| 2,296,290 | Mayrath | Sept. 22, 1942 |
| 2,320,182 | Hill et al. | May 25, 1943 |
| 2,492,923 | Moore et al. | Dec. 27, 1949 |